(12) United States Patent
Stein

(10) Patent No.: US 10,208,824 B2
(45) Date of Patent: Feb. 19, 2019

(54) SUSPENSION ASSEMBLY

(71) Applicant: Zachary Stein, Chandler, AZ (US)

(72) Inventor: Zachary Stein, Chandler, AZ (US)

( * ) Notice: Subject to any disclaimer, the term of this patent is extended or adjusted under 35 U.S.C. 154(b) by 156 days.

(21) Appl. No.: 15/172,299

(22) Filed: Jun. 3, 2016

(65) Prior Publication Data

US 2016/0356333 A1 Dec. 8, 2016

Related U.S. Application Data

(60) Provisional application No. 62/170,326, filed on Jun. 3, 2015.

(51) Int. Cl.
| | | |
|---|---|---|
| F16F 6/00 | (2006.01) | |
| A47C 3/023 | (2006.01) | |
| A47C 31/00 | (2006.01) | |
| F16F 9/53 | (2006.01) | |
| F16F 1/04 | (2006.01) | |
| F16F 1/36 | (2006.01) | |

(52) U.S. Cl.
CPC .............. *F16F 6/005* (2013.01); *A47C 3/023* (2013.01); *A47C 31/003* (2013.01); *F16F 1/04* (2013.01); *F16F 1/36* (2013.01); *F16F 9/535* (2013.01); *F16F 2222/06* (2013.01); *F16F 2224/045* (2013.01)

(58) Field of Classification Search
None
See application file for complete search history.

(56) References Cited

U.S. PATENT DOCUMENTS

| | | | | |
|---|---|---|---|---|
| 4,333,637 | A * | 6/1982 | Shelton | A61G 13/009 206/389 |
| 5,490,713 | A * | 2/1996 | Fukuoka | A47C 3/02 297/217.1 |
| 6,193,297 | B1 * | 2/2001 | Vandermolen | B60N 2/02 180/282 |
| 6,325,365 | B1 * | 12/2001 | Fujita | F16F 6/005 188/161 |
| 6,866,340 | B1 * | 3/2005 | Robertshaw | A47C 7/024 297/312 |
| 7,573,225 | B2 * | 8/2009 | Ebihara | G03F 7/20 248/317 |
| 8,346,441 | B2 * | 1/2013 | Miki | B60N 2/0244 180/218 |
| 8,573,569 | B2 * | 11/2013 | Hasegawa | F16F 7/1011 248/569 |
| 8,913,777 | B2 * | 12/2014 | Pelliccio | B60N 2/0232 381/389 |
| 2002/0089105 | A1 * | 7/2002 | Fujita | F16F 6/005 267/140.14 |

(Continued)

*Primary Examiner* — David E Allred
(74) *Attorney, Agent, or Firm* — Bryan Cave Leighton Paisner LLP

(57) ABSTRACT

A suspension assembly having a shaft with a first end and a second end. The first end of the shaft is mounted to a force receiving member. The shaft is translatable within a linear bearing, which is mounted to a support member. A first magnet is mounted to the force receiving member and a second magnet is mounted to the support member. A shaft collar is mounted to the second end of the shaft. The first and second magnets are adapted to provide a magnetic force against a force applied to the force receiving member.

17 Claims, 20 Drawing Sheets

(56) References Cited

U.S. PATENT DOCUMENTS

| | | | |
|---|---|---|---|
| 2004/0012168 A1* | 1/2004 | Jaekel | B60G 13/00 280/124.1 |
| 2005/0006937 A1* | 1/2005 | Takata | B60N 2/1615 297/344.15 |
| 2009/0134557 A1* | 5/2009 | Spangler | B60N 2/38 267/131 |
| 2011/0204685 A1* | 8/2011 | Dock | B64D 11/0689 297/216.1 |
| 2012/0126601 A1* | 5/2012 | Smith | A61G 5/14 297/339 |
| 2015/0028975 A1* | 1/2015 | Kamiunten | F16F 6/00 335/295 |
| 2016/0003270 A1* | 1/2016 | Franklin | F16B 1/00 439/529 |
| 2016/0037942 A1* | 2/2016 | Guozhu | A47D 13/107 297/274 |
| 2017/0219045 A1* | 8/2017 | Glanzner | F16F 15/035 |
| 2017/0284365 A1* | 10/2017 | Yanez Villarreal | F03D 5/06 |

\* cited by examiner

SUSPENSION ASSEMBLY

CROSS-REFERENCE TO RELATED APPLICATION

This application claims priority to provisional application 62/170,326, filed Jun. 3, 2015.

FIELD OF THE INVENTION

This invention relates generally to a suspension assembly for supporting a weight and, more particularly, to a suspension assembly which may be used in an article of furniture.

SUMMARY OF THE INVENTION

One aspect of the invention is directed to a magnetic suspension assembly which may be used in an article of furniture, such as a chair, for supporting a person seated on the article of furniture. In one embodiment, the suspension assembly has a shaft with a first end and a second end. The first end of the shaft is mounted to a force receiving member. The shaft is translatable within a linear bearing, and the linear bearing is mounted to a support member. A first ring magnet is mounted to the force receiving member and a second ring magnet is mounted to the support member. A shaft collar is mounted to the second end of the shaft. The first and second ring magnets are adapted to provide a magnetic force against a force applied to the force receiving member.

Another aspect of the invention is directed to a chair comprising a chair frame, a plurality of suspension assemblies, and a plurality of seating surface cross members. In another embodiment, the chair frame includes the plurality of suspension assemblies mounted thereto. The plurality of seating surface cross members are translatably mounted to the chair frame by the plurality of suspension assemblies. Each of the plurality of suspension assemblies comprises a shaft having a first end and a second end, wherein the first end is mounted to a seating surface cross member. The shaft is translatable within a linear bearing mounted to the chair frame. A first ring magnet is mounted to one of the plurality of seating surface cross members and a second ring magnet is mounted to the chair frame. A shaft collar is mounted to the second end of the shaft. The first and second ring magnets are adapted to provide a magnetic force against a force applied to one of the plurality of seating surface cross members.

BRIEF DESCRIPTION OF THE FIGURES

These and other features, aspects and advantages of the invention will become more fully apparent from the following detailed description, appended claims, and accompanying drawings, wherein the drawings illustrate features in accordance with exemplary embodiments of the invention, and wherein:

Like reference numerals indicate corresponding parts throughout the several views of the various drawings.

DETAILED DESCRIPTION

Figure 1:
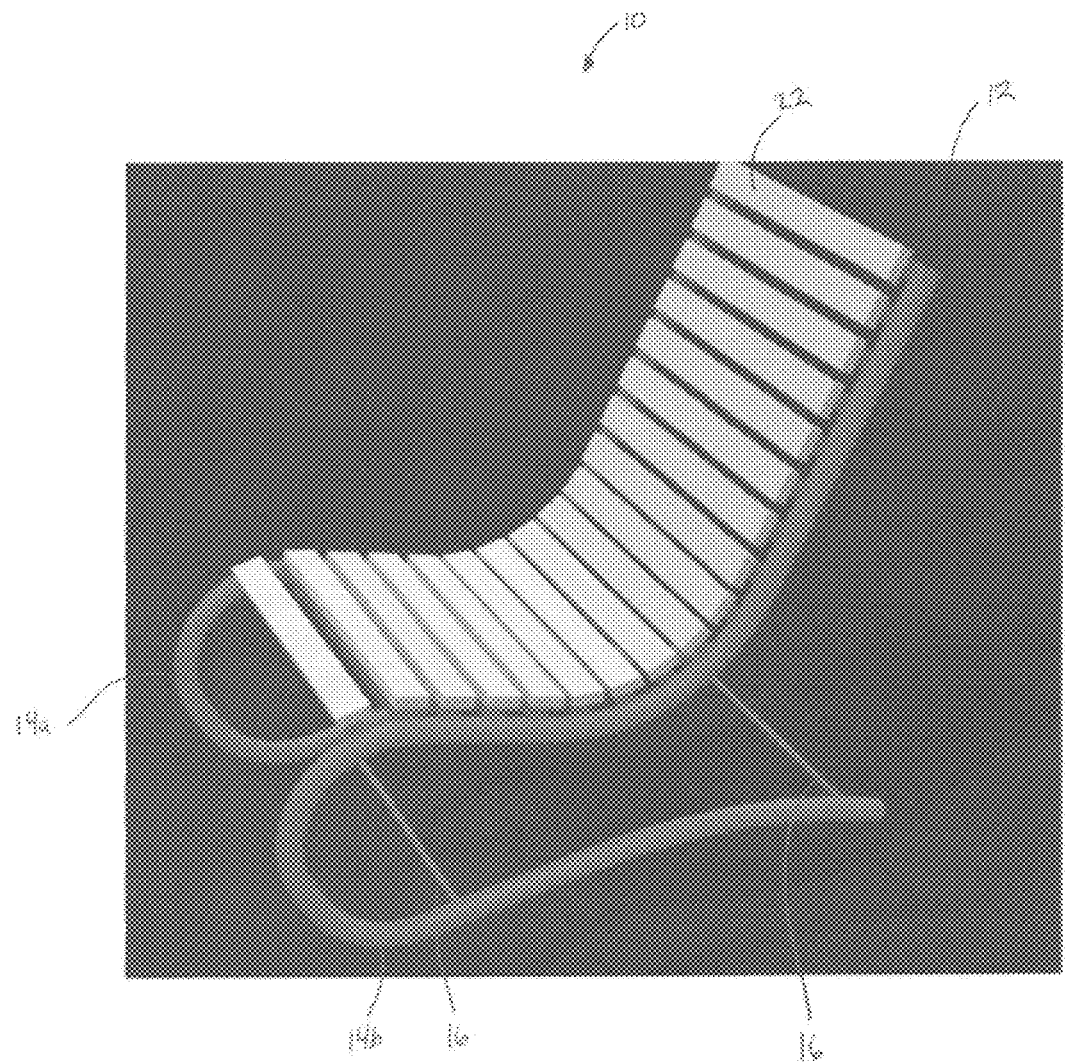
FIG. 1 is an image of an article of furniture incorporating a plurality of suspension assemblies according to a first embodiment of the disclosure.
Figure 2:
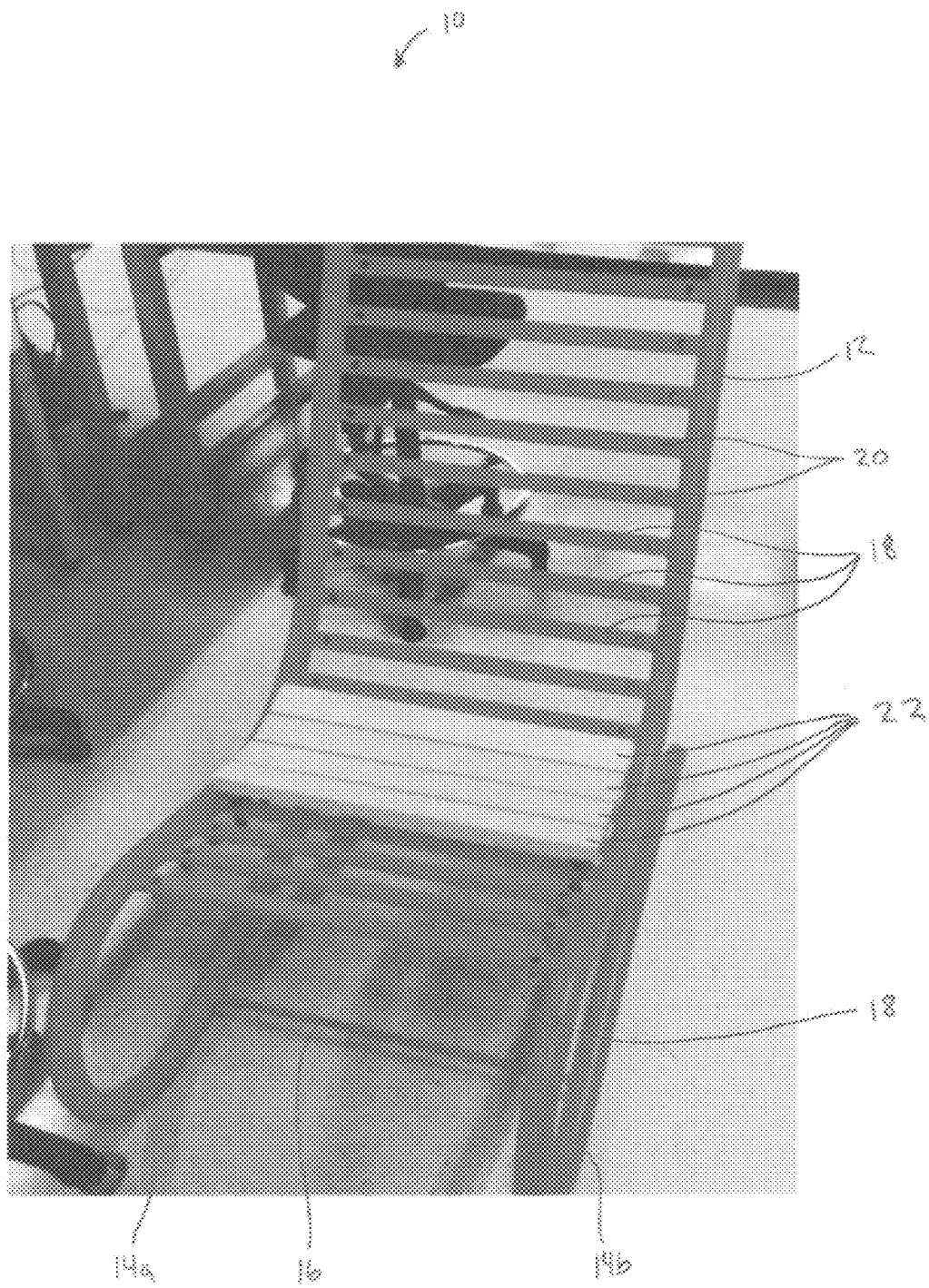
FIG. 2 is an image of an article of furniture incorporating a plurality of suspension assemblies according to a first embodiment of the disclosure.
Figure 3:
FIG. 3 is an image of an article of furniture incorporating a plurality of suspension assemblies according to a first embodiment of the disclosure.
Figure 4:
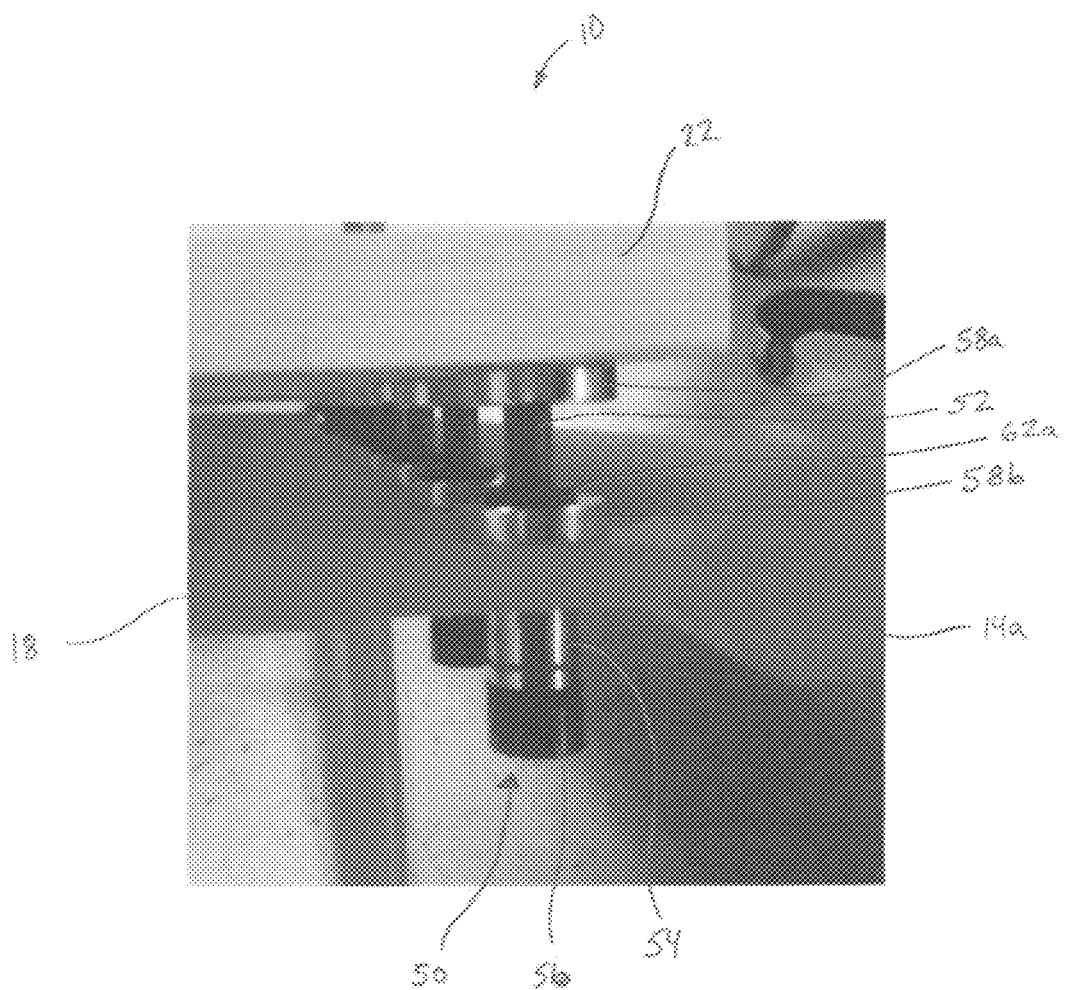
FIG. 4 is an image of an article of furniture incorporating a plurality of suspension assemblies according to a first embodiment of the disclosure.
Figure 5:
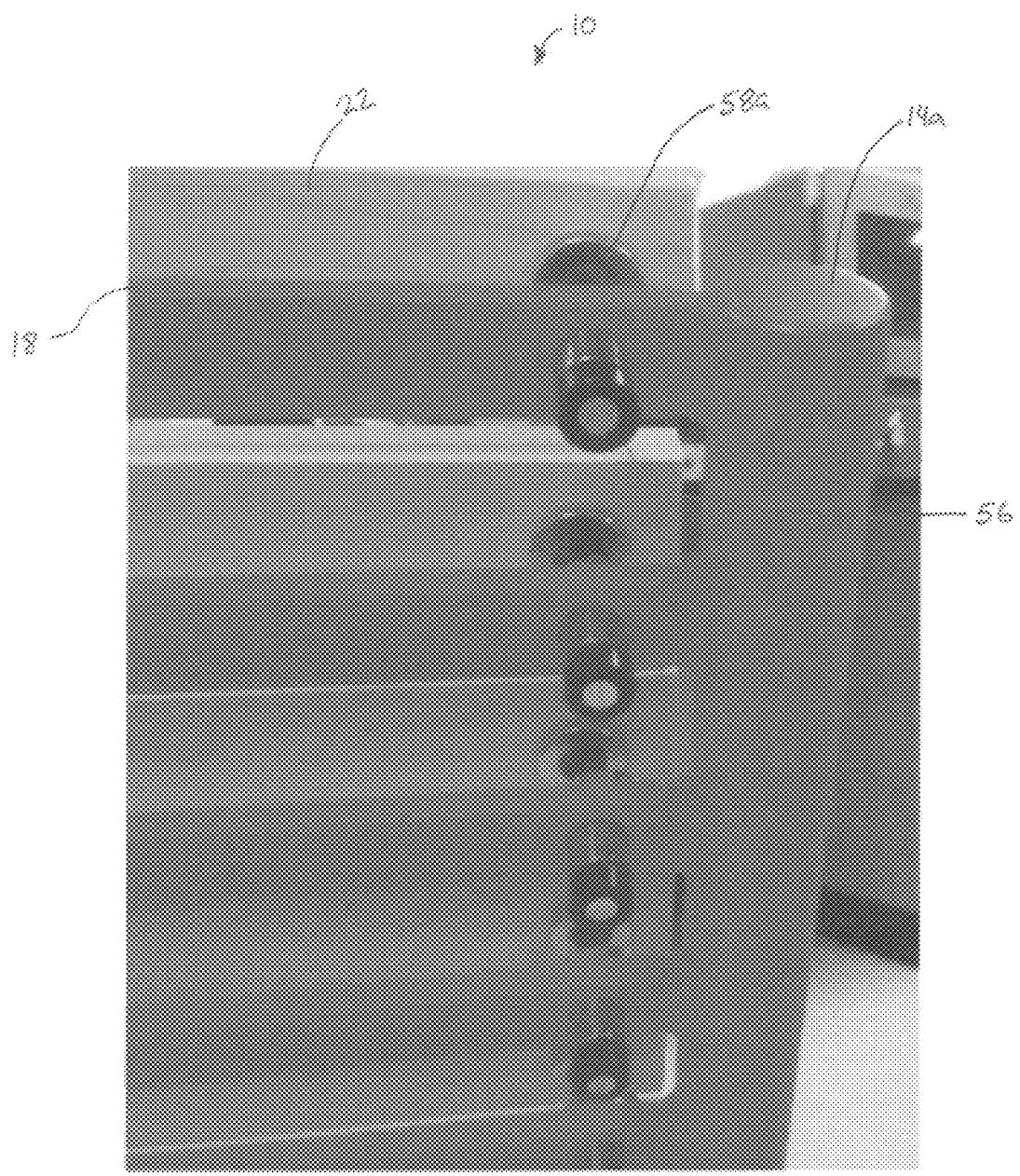
FIG. 5 is an image of an article of furniture incorporating a plurality of suspension assemblies according to a first embodiment of the disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. All numbers expressing measurements and so forth used in the specification and claims are to be understood as being modified in all instances by the term "about." It should also be noted that any references herein to front and back, right and left, top and bottom and upper and lower are intended for convenience of description, not to limit an invention disclosed herein or its components to any one positional or spatial orientation.

With reference to FIGS. 1-7 an embodiment of an article of furniture 10 utilizing a suspension assembly 50 is described. Article of furniture 10, shown as a chair, includes frame 12 to which a plurality of seating surface cross members 22 are translatably mounted by a plurality of suspension assemblies 50. When a person sits in chair 10 and places their weight on the plurality of seating surface cross members 22, the plurality of seating surface cross members 22 translate with respect to frame 12. As will be described in greater detail elsewhere, magnets in the suspension assembly 50 provide a magnetic force to cushion the person seated in the chair.

Chair frame 12 includes left and right side frame members 14a, 14b connected by a plurality of lower frame members 16 and a plurality of main frame members 18. Left and right side members 14a, 14b are shown as identical tubes bent to form an ergonomic shape for a chair. As illustrated, two lower frame members 16 span between left and right side frame members 14a, 14b and provide structural support for the lower portion of chair frame 12. Lower frame members 16 add rigidity to the lower portion of chair frame 12 and reduce or eliminate the tendency of left and right side frame members 14a, 14b from splaying outward from one another. While two lower frame members 16 are shown, it will be understood, however, that in various embodiments, fewer than two or greater than two lower frame members 16 may be used to provide structural support to chair frame 12 without departing from the scope of the disclosure.

The plurality of main frame members 18 span between left and right side frame members 14a, 14b and provide structural support for the upper portion of chair frame 12. Main frame members 18 serve as support members 66 of suspension assembly 50, as described in greater detail elsewhere herein. Main frame members 18 also add rigidity to the upper portion of chair frame 12 and reduce or eliminate the tendency of left and right side frame members 14a, 14b from splaying outward from one another. Eighteen main frame members 18 are shown; however, it will be understood, however, that in various embodiments, fewer than eighteen or greater than eighteen main frame members 18 may be used to provide structural support to chair frame 12 without departing from the scope of the disclosure. Main frame members 18 are illustrated as elongate rectangular slats that extend the width of chair 10 between left and right side frame members 14a, 14b. In other embodiments, however, it will be understood that main frame members 18 may be other shapes including, but not limited to, circular, ovular, square, etc. without departing from the scope of the disclosure. Additionally, the plurality of main frame members 18 form the foundation of the seating surface of chair 10.

A plurality of seating surface cross members 22 are translatably mounted to the plurality of main frame members 18 by a plurality of suspension assemblies 50. Seating surface cross members 22 serve as force receiving members 64 of suspension assembly 50, as described in greater detail elsewhere herein. Eighteen seating surface cross members 22 are shown; however, it will be understood, however, that in various embodiments, fewer than eighteen or more than eighteen seating surface cross members 22 may be used to provide a seating surface for chair 10 without departing from the scope of the disclosure. Preferably, the number of seating surface cross members 22 is equal to the number of main frame members 18. That is, for each main frame member 18 there is a corresponding seating surface cross member 22 translatable mounted thereto. However, it will be understood that in other embodiments, the number of seating surface cross members 22 may be less than or greater than the number of main frame members 18. Seating surface cross members 22 are illustrated as elongate rectangular slats that extend the width of chair 10 between left and right side frame members 14a, 14b. In other embodiments, however, it will be understood that seating surface cross members 22 may extend past the left and/or right side frame member 14a, 14b. In other embodiments, however, it will be understood that seating surface cross members 22 may be other shapes including, but not limited to, circular, ovular, square, etc. without departing from the scope of the disclosure.

Figure 6:
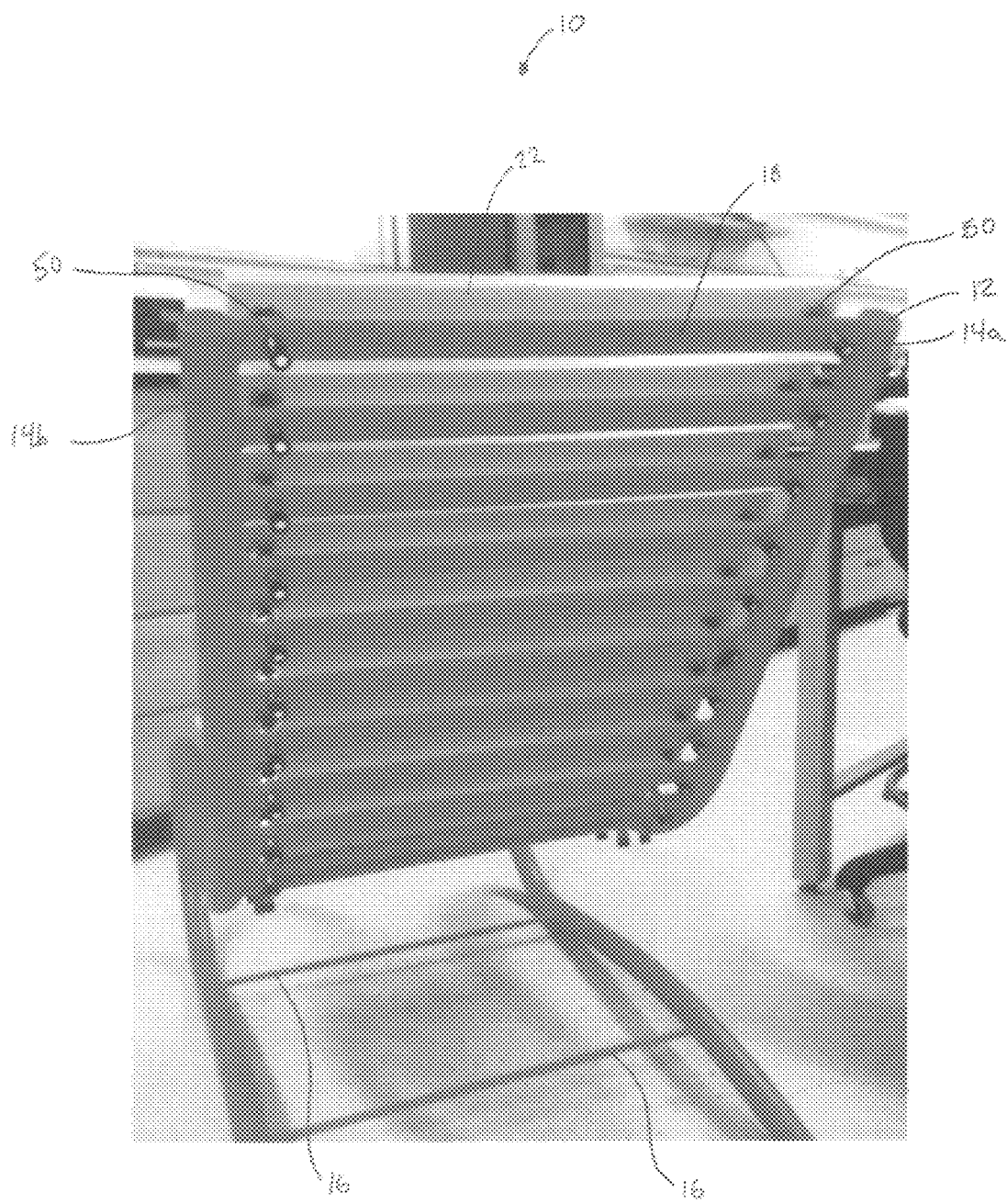
FIG. 6 is an image of an article of furniture incorporating a plurality of suspension assemblies according to a first embodiment of the disclosure.

As shown in FIG. 6, each seating surface cross member 22 is translatably mounted to each main support member 18 by a pair of suspension assemblies 50 located proximate the ends of seating surface cross member 22 and main support member 18. That is, first and second suspension assemblies 50 are located in openings 20 (see FIG. 2) proximate the left and right side frame members 14a, 14b in each main support member 18.

Figure 7:
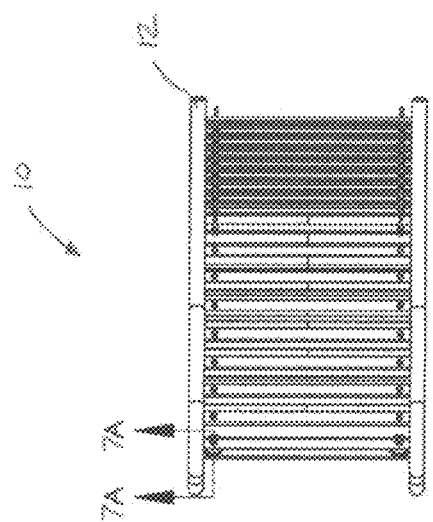
FIG. 7 is a bottom view of an article of furniture incorporating a plurality of suspension assemblies according to a first embodiment of the disclosure.
Figure 7A:
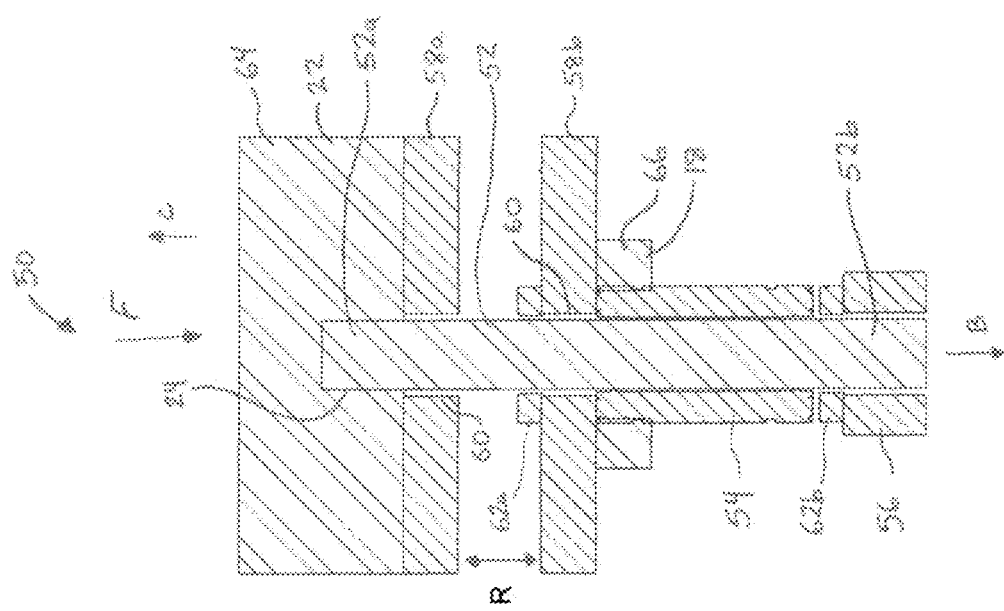
FIG. 7A is a section view of a suspension assembly according to a first embodiment of the disclosure.
Figure 8A:
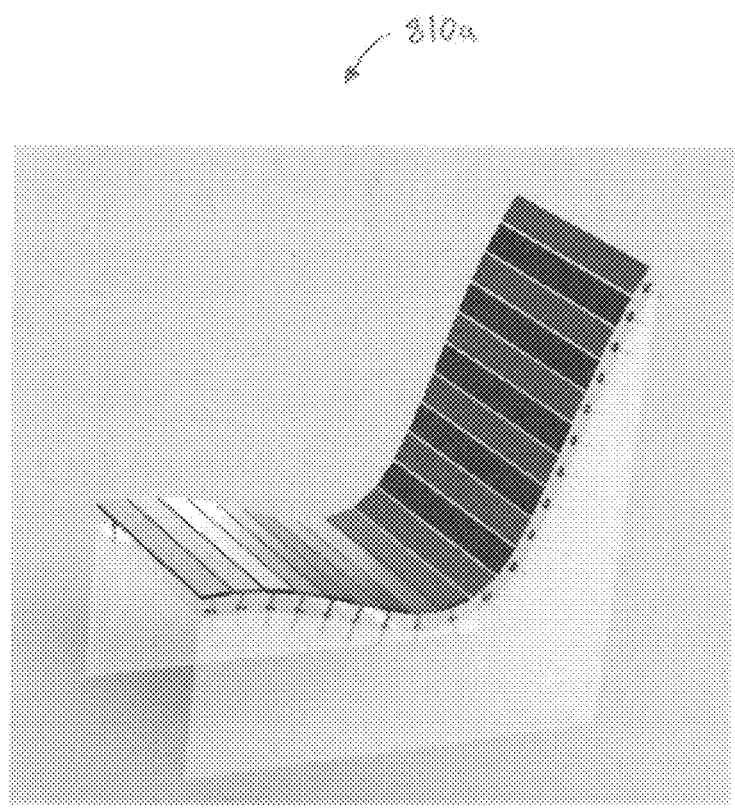
FIG. 8A is an image of an article of furniture incorporating a plurality of suspension assemblies according to another embodiment of the disclosure.
Figure 8B:
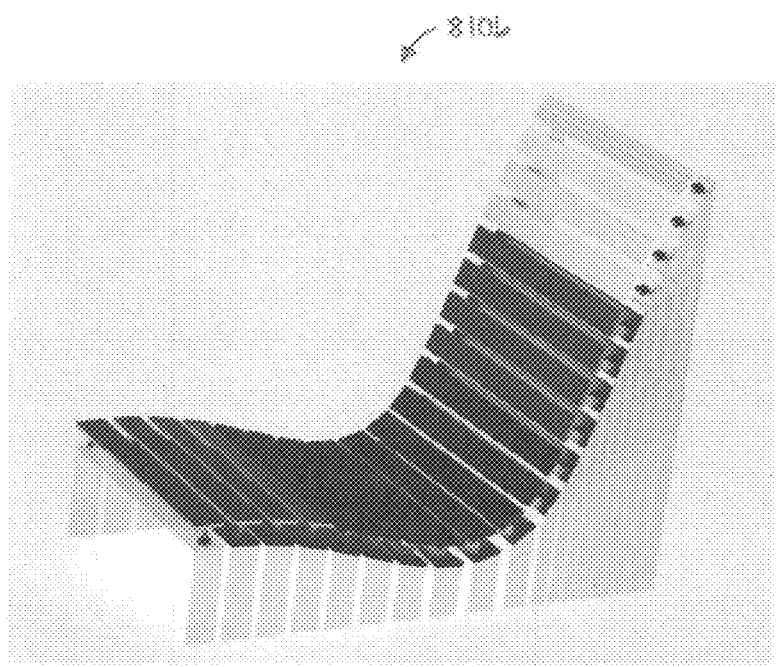
FIG. 8B is an image of an article of furniture incorporating a plurality of suspension assemblies according to another embodiment of the disclosure.
Figure 8C:
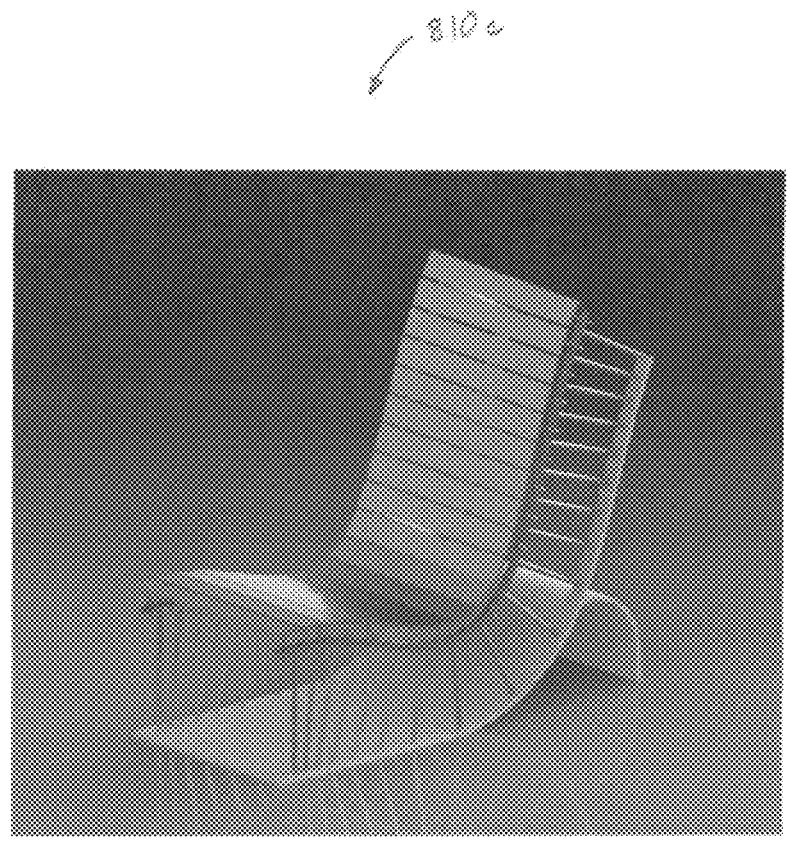
FIG. 8C is an image of an article of furniture incorporating a plurality of suspension assemblies according to another embodiment of the disclosure.
Figure 8D:
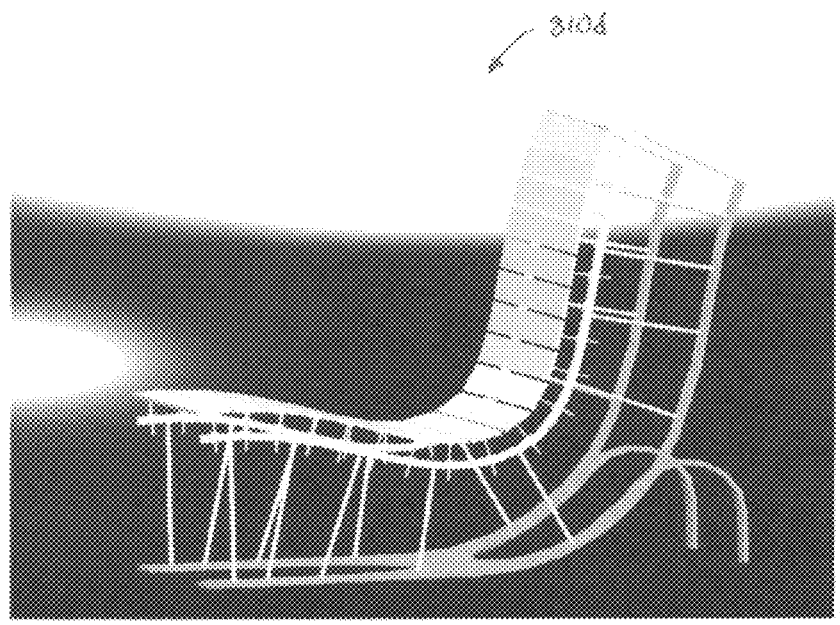
FIG. 8D is an image of an article of furniture incorporating a plurality of suspension assemblies according to another embodiment of the disclosure.

With reference now to FIGS. 7 and 7A, the suspension assembly 50 is described in detail. Each suspension assembly 50 includes shaft 52 which translates within and with respect to linear bearing 54, wherein linear bearing 54 is mounted to a support member 66. A first end 52a of shaft 52 is mounted to a force receiving member 64. Force receiving member 64 receives a force which acts on suspension assembly 50 causing shaft 52 to translate. In chair 10, seating surface cross member 22 is the force receiving member 64. Preferably, first end 52*a* of shaft 52 is press fit into opening 24 in seating surface cross member 22. In other embodiments, however, first end 52*a* of shaft 52 may be mounted to seating surface cross member 22 in a variety of ways including, but not limited to, adhesives, screws, welding, soldering, brazing, and/or any other fasteners or fastening techniques known in the art. A shaft collar 56 is mounted to the second end 52*b* of shaft 52. Shaft collar 56 is preferably mounted to second end 52*b* of shaft 52 using a set screw (not shown). In other embodiments, however, first end 52*a* of shaft 52 may be mounted to seating surface cross member 22 in a variety of ways including, but not limited to, adhesives, screws, welding, soldering, brazing, and/or any other fasteners or fastening techniques known in the art. In yet other embodiments, shaft collar 56 may be integrally formed into shaft 52.

Linear bearing 54 is mounted within opening 20 (see FIG. 2) extending through main frame member 18. In chair 10, main frame member 18 is the support member 66. Shaft 52 is adapted to freely slide or translate within linear bearing 54 without binding. Linear bearing 54 is a linear recirculating ball bearing which offers support of shaft 52 in the radial direction while also providing smooth axial movement. Exemplary linear bearings may be Part Number 61205K75 available from McMaster-Carr or 8 mm linear ball bearings having Model Number LM8/LM8UU available from AliExpress.com. Preferably, linear bearing 54 is press fit into opening 20 in main frame member 18. In other embodiments, however, linear bearing 54 may be mounted to main frame member 18 in a variety of ways including, but not limited to, adhesives, screws, welding, soldering, brazing, and/or any other fasteners or fastening techniques known in the art. In alternative embodiments, linear bearing 54 may be replaced by a bushing, such as for example, a graphite infused-brass bushing or a plastic, nylon or Teflon® bushing. In yet other embodiments, opening 20 in may be adapted to permit shaft 52 to translate within opening 20 without the need for a linear bearing or bushing.

Suspension assembly 50 further includes a first magnet 58*a* and a second magnet 58*b*. First magnet 58*a* is mounted to, on or in the underside of seating surface cross member 22 and second magnet 58*b* is mounted to, on or in the top side of main frame member 18. Alternatively, in some embodiments, first magnet 58*a* may be mounted to or on shaft 52 proximate first end 52*a* of shaft 52 and second magnet 58*b* may be mounted to or on linear bearing 54. First and second magnets 58*a*, 58*b* are preferably neodymium ring magnets having a central opening 60 through which shaft 52 may extend. First and second magnets 58*a*, 58*b* are oriented in suspension assembly 50 to repel one another as shown by arrows A in FIG. 7A. When a person sits in chair 10 and exerts a force (F) on the top side of seating surface cross member 22, the exerted force (F) is counteracted by the magnetic repulsive force between first and second magnets 58*a*, 58*b*. The exerted force (F) may be great enough to cause translation of shaft 52 with respect to main support member 18 and linear bearing 54 in the direction of arrow B. The magnetic repulsive force between first and second magnets 58*a*, 58*b* provides a spring-like cushion for a person sitting on chair 10 and/or a weight placed on chair 10.

Although neodymium ring magnets are preferred, in other embodiments, other magnet types may be used for first and second magnets 58*a*, 58*b* including, but not limited to, other rare-earth magnets (e.g., samarium-cobalt), permanent magnets made of other materials (e.g., ceramic, ferrite, alnico, etc.), electromagnets, etc. without departing from the scope of the disclosure. Additionally, in other embodiments, first and second magnets 58*a*, 58*b* may be in a shape other than a ring; for example, first and second magnets 58*a*, 58*b* may be square, rectangular, cylindrical, spherical or bar in shape without departing from the scope of the disclosure. That is, instead of two ring magnets, opposed square, rectangular, cylindrical, spherical or bar-shaped magnets may be placed on seating surface cross member 22 and main frame member 18 to provide the magnetic repulsive force.

Shaft collar 56 prevents shaft 52 from being pushed completely out of linear bearing 54 along arrow C by the magnetic repulsive force between first and second magnets when no force is applied to seating surface cross member 22. That is shaft collar 56 acts as a stop. As shown in FIG. 7A, a first rubber bushing or washer 62*a* may be placed between first and second magnet 58*a*, 58*b*. First rubber bushing 62*a* prevents first and second magnets 58*a*, 58*b* from hitting each other when a force (F) is exerted on seating surface cross member 22. This reduces or eliminates any undesirable sound that would otherwise occur from first and magnets 58*a*, 58*b* hitting each other. Additionally, first rubber bushing 62*a* also reduces or eliminates any damage to first and second magnets 58*a*, 58*b* when a force (F) is exerted on seating surface cross member 22. This is particularly important because neodymium magnets are brittle and can easily chip or shatter when hit. A second rubber bushing or washer 62*b* may be placed between linear bearing 54 and shaft collar 56 to prevent linear bearing 54 and shaft collar 56 from hitting each other when no force is exerted on seating surface cross member 22. This reduces or eliminates any undesirable sound that would otherwise occur from linear bearing 54 and shaft collar 56 hitting each other.

In various embodiments, for example, the first and/or second magnets 58*a*, 58*b* of suspension assembly 50 may be coated with a rubber or elastomeric material which provides impact protection. Therefore first rubber bushing 62*a* may not be required. Additionally, in various embodiments, for example, shaft collar 56 and/or linear bearing 54 may be coated with a rubber or elastomeric material which provides impact protection. Alternatively, shaft collar 56 may be made of a rubber or elastomeric material which is integrally formed on the second end 52*b* of shaft 52. Therefore second rubber bushing 62*b* may not be required.

The plurality of suspension assemblies 50 mounted to chair frame 12 and the plurality of seating surface cross members 22 translatably mounted to chair frame 12 by the plurality of suspension assemblies 50 provide for a seating surface that cushions the person sitting thereon by magnetic force. Each individual seating surface cross member 22 can translate a different amount based on the force or weight exerted on each seating surface cross member 22. Thus chair 10 is able to "mold" or conform to the shape of each person who sits on chair 10.

It will be understood that the illustrated design of chair frame 12 is purely exemplary and that other constructions, designs, shapes, sizes, and/or materials may be used as a frame for an article of furniture which utilizes suspension assembly 50 without departing from the scope of the disclosure. Preferably, the components of chair frame 12 are made of steel and the plurality of seating surface cross members 22 are made of wood. However, it will be understood that a variety of materials may be used for the components of chair frame 12 and seating surface cross members 22, including, but not limited to, metal (e.g., steel, stainless steel, iron, aluminum, titanium, etc. and combinations or alloys thereof), plastic, wood, composites (e.g., carbon fiber, aramid fiber, para-aramid fiber, meta-aramid fiber, etc.). A variety of alternative designs of chairs 810*a*, 810*b*, 810*c*, 810*d* incorporating the suspension assembly described herein are illustrated in FIGS. 8A-8D, respectively. Additionally, while seating surface cross members 22 are shown as separate from one another, it will be understood that in various embodiments, for example, seating surface cross members 22 may be connected by a fabric covering or may be a continuous piece of flexible material.

Alternative embodiments of uses of suspension assembly 50 are illustrated in FIGS. 9-12 and are described below. Some features of the uses of suspension assembly 50 described herein are common to one another and, accordingly, descriptions of such features in one embodiment should be understood to apply to other embodiments. Furthermore, particular characteristics and aspects of one embodiment may be used in combination with, or instead of, particular characteristics and aspect of another embodiment.

Figure 9A:
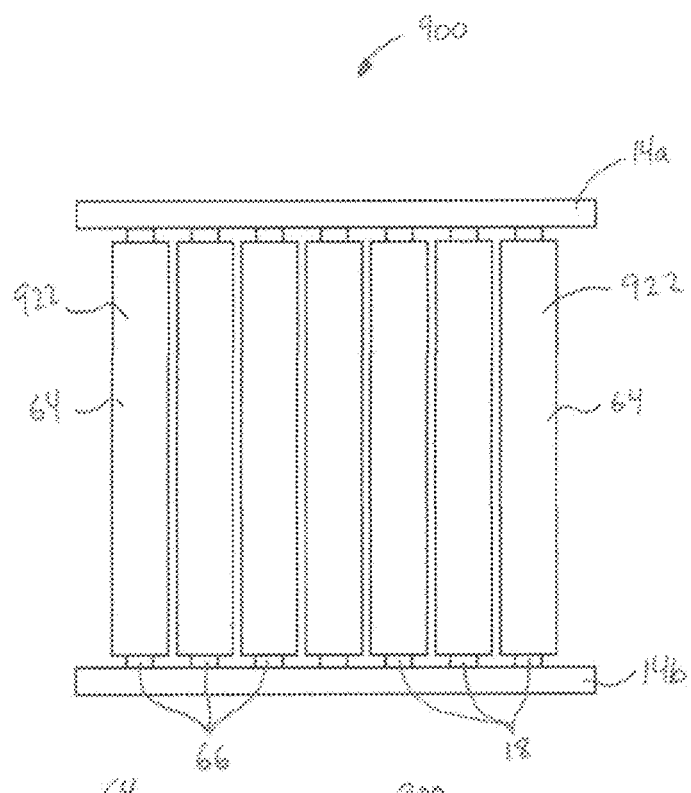
FIG. 9A is a top view of an article of furniture incorporating a plurality of suspension assemblies according to another embodiment of the disclosure.
Figure 9B:
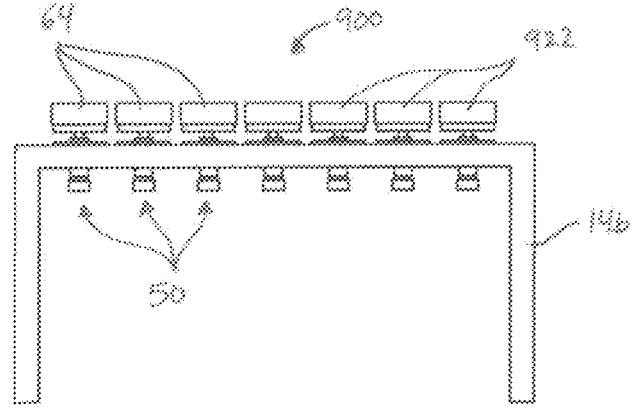
FIG. 9B is a right side view of an article of furniture incorporating a plurality of suspension assemblies according to the embodiment of the disclosure shown in FIG. 9A.
Figure 9C:
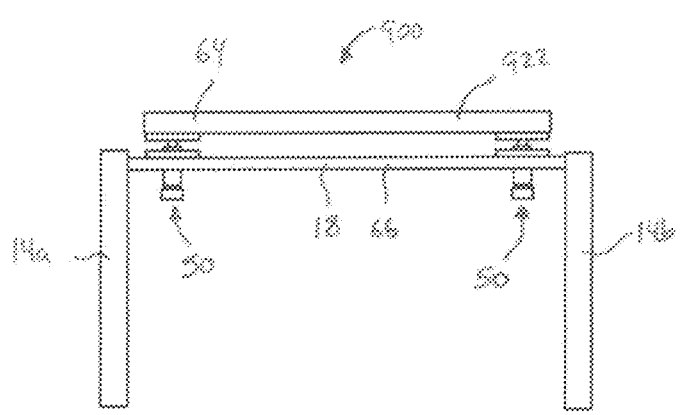
FIG. 9C is a front view of an article of furniture incorporating a plurality of suspension assemblies according to the embodiment of the disclosure shown in FIG. 9A.
Figure 10A:
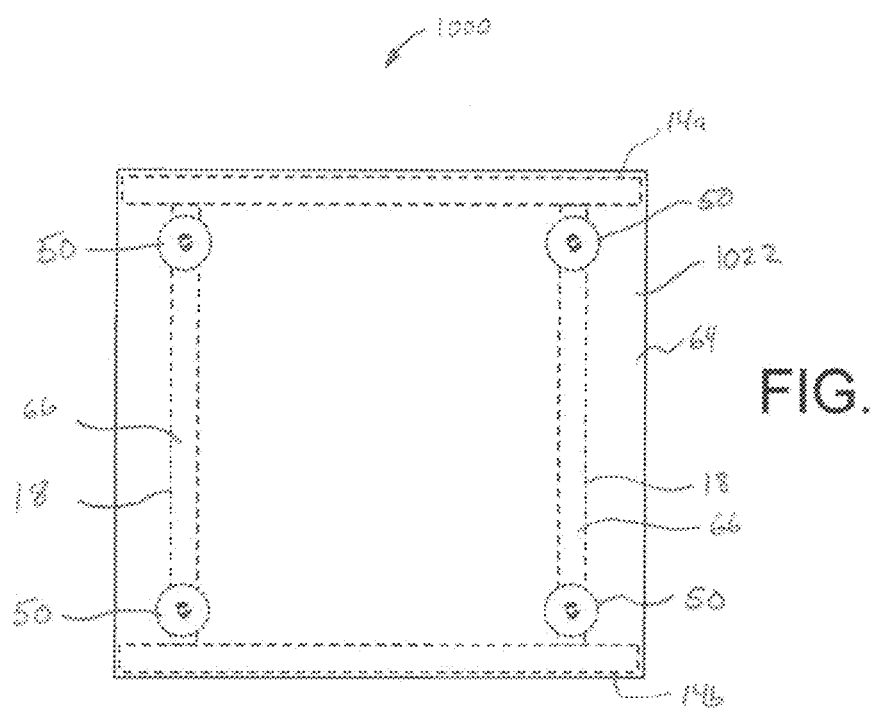
FIG. 10A is a top view of an article of furniture incorporating a plurality of suspension assemblies according to another embodiment of the disclosure.
Figure 10B:
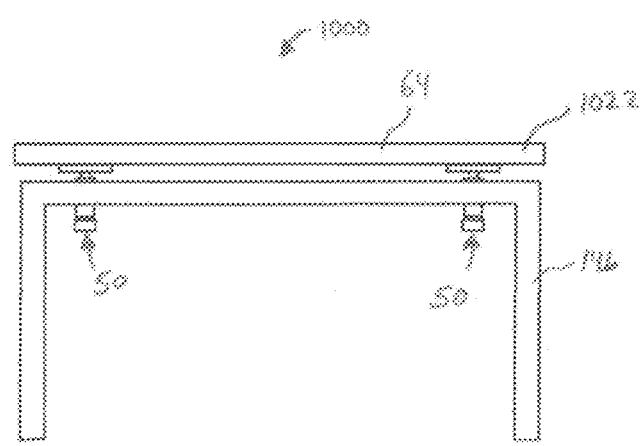
FIG. 10B is a right side view of an article of furniture incorporating a plurality of suspension assemblies according to the embodiment of the disclosure shown in FIG. 10A.
Figure 10C:
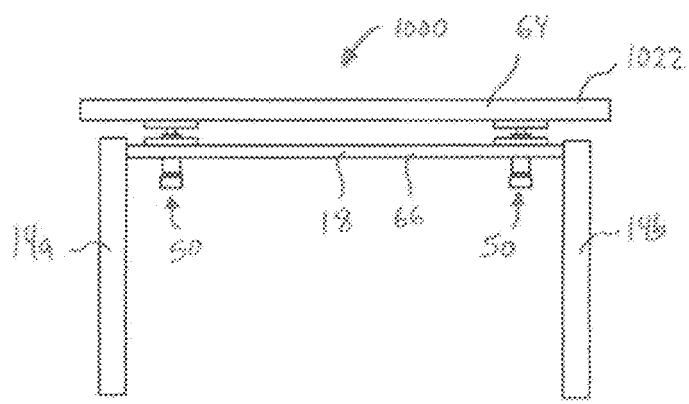
FIG. 10C is a front view of an article of furniture incorporating a plurality of suspension assemblies according to the embodiment of the disclosure shown in FIG. 10A.

With reference to FIG. 9A-9C, a plurality of suspension assemblies 50 may be used in an ottoman 900 to support a plurality of ottoman surface cross members 922. As shown in FIGS. 10A-10C, a plurality of suspension assemblies 50 (e.g., about four) may be used in a table 1000 to support a table top 1022.

Figure 11A:
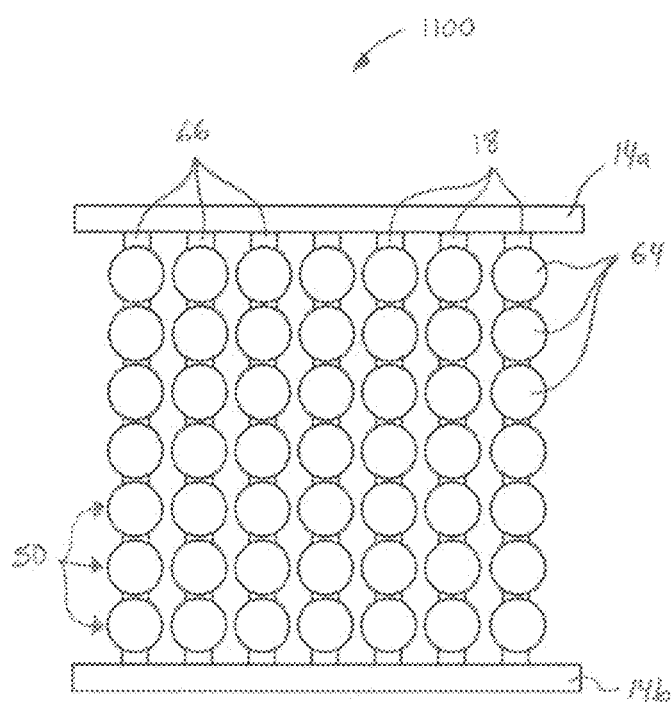
FIG. 11A is a top view of an article of furniture incorporating a plurality of suspension assemblies according to another embodiment of the disclosure.
Figure 11B:
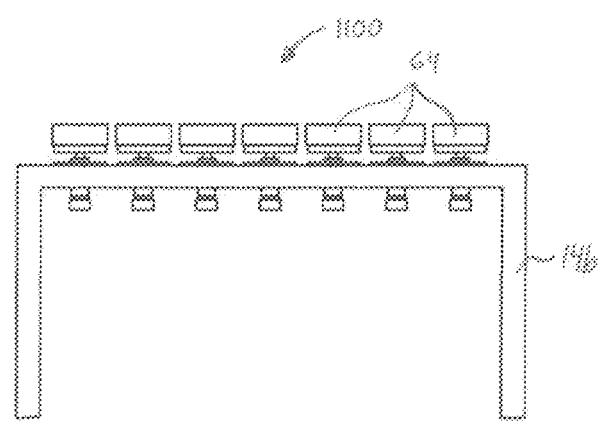
FIG. 11B is a right side view of an article of furniture incorporating a plurality of suspension assemblies according to the embodiment of the disclosure shown in FIG. 11A.
Figure 11C:
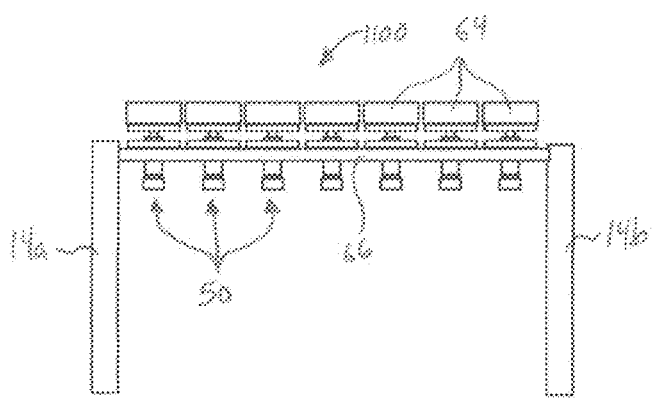
FIG. 11C is a front view of an article of furniture incorporating a plurality of suspension assemblies according to the embodiment of the disclosure shown in FIG. 11A.

Illustrated in FIGS. 11A-11C is yet another embodiment using suspension assembly 50. A plurality of suspension assemblies 50 are shown used in an ottoman 1100. Unlike chair 10, ottoman 900, and table 1000, each of the plurality of suspension assemblies 50 includes an individual force receiving member 64. Preferably, each force receiving member 64 is not connected to any adjacent force receiving member 64. While, shown as an ottoman, it will be understood that a chair, table, bed, mattress, and/or any other type of article of furniture may use individual and independent suspension assemblies 50. Utilizing independent suspension assemblies 50, each with its own independent force receiving member 64, the article of furniture may more easily conform, mold, and/or react to the force or weight placed thereon. For example, if a chair utilizes independent suspension assemblies 50, each independent suspension assembly 50 can translate a certain amount based on the weight of a higher number of discrete locations on the person's body seated in the chair. This may result in a seat back and seat bottom that better conform to the shape of the person sitting thereon resulting in a more comfortable and/or supportive chair. The individual suspension assemblies function much like the individual pocketed coil springs of a mattress.

Figure 12:
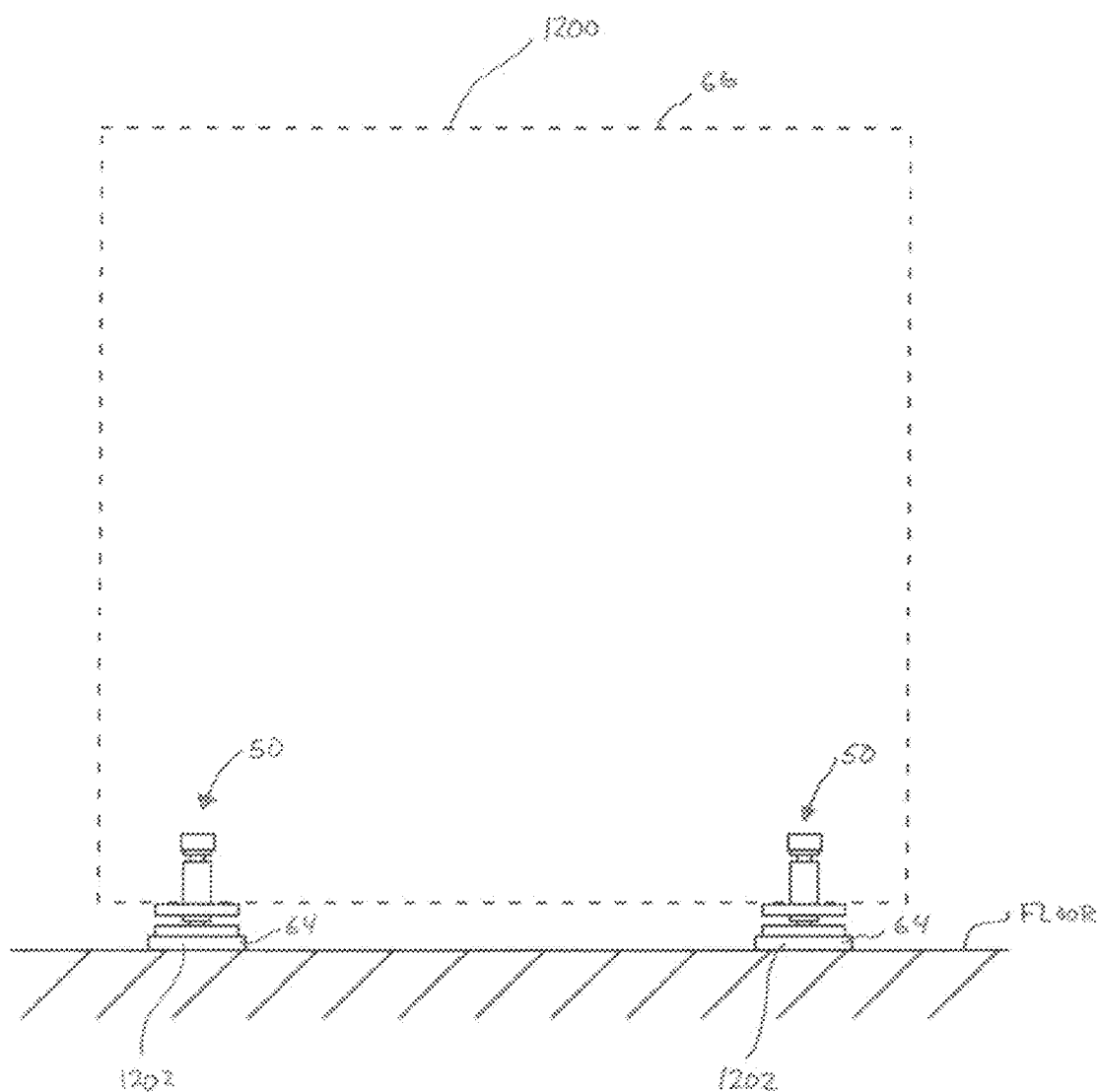
FIG. 12 is a front view of an object supported by a plurality of suspension assemblies according to another embodiment of the disclosure.

Additionally, as shown in FIG. 12, a plurality of suspension assemblies 50 may be used to support an object 1200 on a floor. The object is shown in dashed lines to permit easier viewing of the orientation of suspension assemblies 50. Suspension assemblies 50 may further include a foot 1202 mounted to first end 52*a* of shaft 52. Preferably, first end 52*a* of shaft 52 is press fit into a opening in foot 1202. In other embodiments, however, first end 52*a* of shaft 52 may be mounted to foot 1202 in a variety of ways including, but not limited to, adhesives, screws, welding, soldering, brazing, and/or any other fasteners or fastening techniques known in the art. Foot 1202 rests on floor. Foot 1202 serves as force receiving member 64 and object 1200 serves as support member 66. Suspension assemblies 50 placed on the bottom of object 1200 may provide for self-leveling of object 1200, as well as vibration- and movement-isolation of object 1200 from floor, other objects, and/or persons proximate to object 1200. Object 1200 may include, but is not limited to, a piece of machinery, an appliance, a washing machine, a dryer, a refrigerator, a freezer, a furnace, a boiler, a computer, a server, a musical instrument, a radio, a phonograph, and/or any other object which may benefit from self-leveling and vibration- and movement-isolation.

Alternative embodiments of suspension assemblies are illustrated in FIGS. 13-17, and 18A-18D and are described below. Some features of suspension assemblies 50, 1350, 1450, 1550, and 1650, 1750, 1850 described herein are common to one another and, accordingly, descriptions of such features in one embodiment should be understood to apply to other embodiments. Furthermore, particular characteristics and aspects of one embodiment may be used in combination with, or instead of, particular characteristics and aspect of another embodiment.

Figure 13:
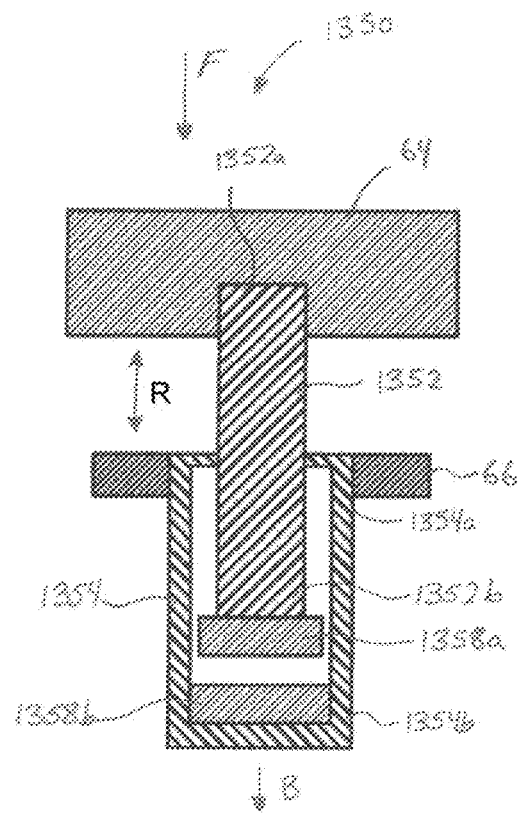
FIG. 13 is a section view of a suspension assembly according to another embodiment of the disclosure.

With reference now to FIG. 13, an alternative embodiment of suspension assembly 1350 is described in detail. Suspension assembly 1350 includes translatable first shaft 1352 which translates within and with respect to second tubular shaft 1354, wherein second tubular shaft 1354 is mounted to a support member 66. A first end 1352*a* of first shaft 1352 is mounted to a force receiving member 64. Force receiving member 64 receives a force which acts on suspension assembly 1350 causing first shaft 1352 to translate within second tubular shaft 1354. Preferably, first end 1352*a* of first shaft 52 is press fit into an opening in force receiving member 64. In other embodiments, however, first end 1352*a* of shaft 1352 may be mounted to force receiving member 64 in a variety of ways including, but not limited to, adhesives, screws, welding, soldering, brazing, and/or any other fasteners or fastening techniques known in the art.

Second tubular shaft 1354 includes a first end 1354*a* and a second end 1352*b*. First end 1354*a* of second tubular shaft 1354 is mounted within an opening extending through support member 66. Preferably, second tubular shaft 1354 is press fit into the opening in support member 66. In other embodiments, however, second tubular shaft 1354 may be mounted to support member 66 in a variety of ways including, but not limited to, adhesives, screws, welding, soldering, brazing, and/or any other fasteners or fastening techniques known in the art.

Suspension assembly 1350 further includes a first magnet 1358*a* on the second end 1352*b* of first shaft 1352 and a second magnet 1358*b* on the second end 1354*b* of second tubular shaft 1354. First and second magnets 1358*a*, 1358*b* are preferably neodymium ring magnets. First and second magnets 1358*a*, 1358*b* are oriented in suspension assembly 1350 to repel one another as shown by arrows R in FIG. 13. When a force (F) is acted on the top side of force receiving member 64, the exerted force (F) is counteracted by the magnetic repulsive force between first and second magnets 1358*a*, 1358*b*. The exerted force (F) may be great enough to cause translation of first shaft 1352 with respect to support member 66 and second tubular shaft 1354 in the direction of arrow B.

Although neodymium magnets are preferred, in other embodiments, other magnet types may be used for first and second magnets 1358*a*, 1358*b* including, but not limited to, other rare-earth magnets (e.g., samarium-cobalt), permanent magnets made of other materials (e.g., ceramic, ferrite, alnico, etc.), electromagnets, etc. without departing from the scope of the disclosure.

Figure 14:
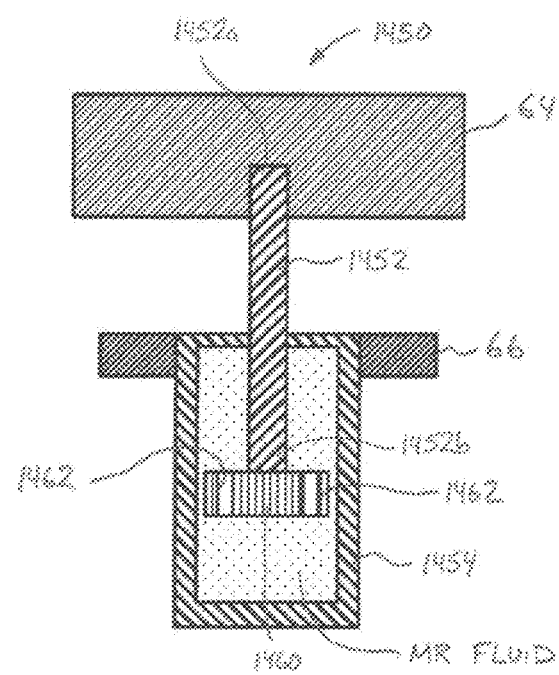
FIG. 14 is a section view of a suspension assembly according to another embodiment of the disclosure.

With reference now to FIG. 14, an alternative embodiment of suspension assembly 1450 is described in detail. Suspension assembly 1450 includes a magneto rheological (MR) damper as known in the art. That is, suspension assembly 1450 includes a translatable shaft 1452 which translates within and with respect to cylinder 1454. Shaft 1452 includes a first end 1452*a*, a second end 1452*b*, and a piston 1460 mounted to second end 1452. Piston 1460 may include one or more fluid passages 1462 and one or more electromagnets (not shown). Cylinder 1454 is filled with a magneto rheological (MR) fluid and the electromagnets create a variable magnetic field across the fluid passages 1462. When no magnetic field is applied, the MR fluid freely travels through fluid passages 1462. However, when a magnetic field is applied, the viscosity of the MR fluid is increased resulting in a decreased rate of movement of the MR fluid through fluid passages 1462. Utilizing an MR damper in suspension assembly 1450, the suspension assembly 1450 may be able to quickly react to any force exerted on the force receiving member 64 mounted to the first end of shaft 1452.

Preferably, first end 1452*a* of shaft 1452 is press fit into a opening in force receiving member 64. In other embodiments, however, first end 1452*a* of shaft 1452 may be mounted to force receiving member 64 in a variety of ways including, but not limited to, adhesives, screws, welding, soldering, brazing, and/or any other fasteners or fastening techniques known in the art. Preferably, cylinder 1454 is press fit into the opening in support member 66. In other embodiments, however, cylinder 1454 may be mounted to support member 66 in a variety of ways including, but not limited to, adhesives, screws, welding, soldering, brazing, and/or any other fasteners or fastening techniques known in the art.

Figure 15:
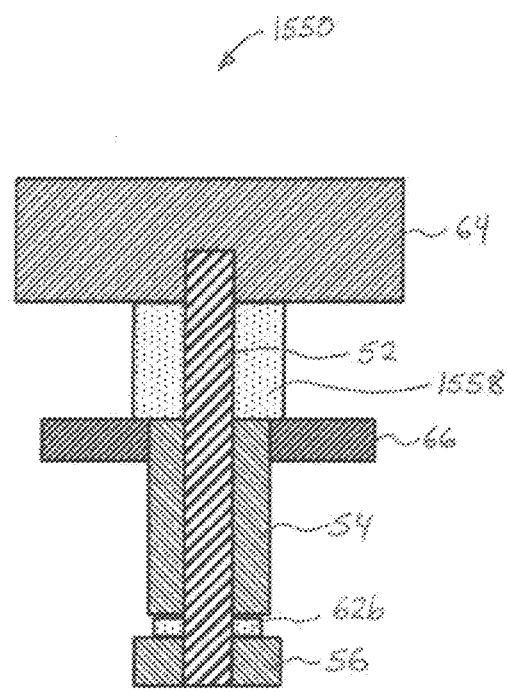
FIG. 15 is a section view of a suspension assembly according to another embodiment of the disclosure.
Figure 16:
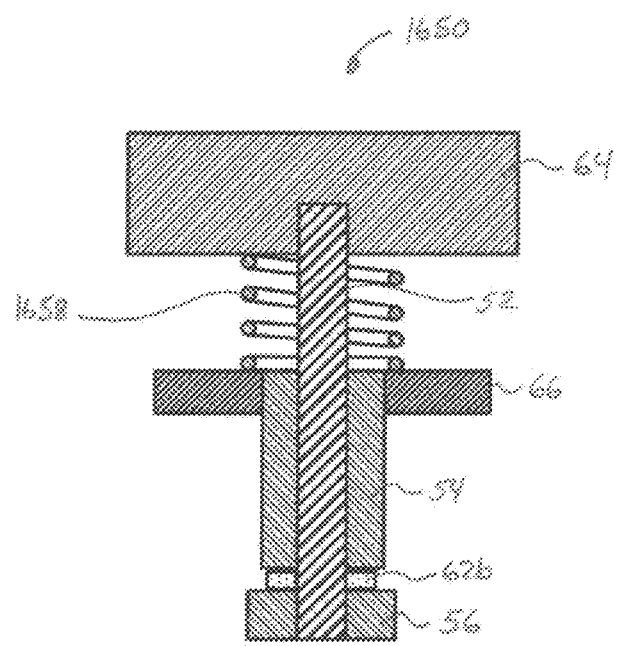
FIG. 16 is a section view of a suspension assembly according to another embodiment of the disclosure.

With reference now to FIGS. 15 and 16, yet other alternative embodiments of suspension assembly are described in detail. Suspension assemblies 1550 and 1650 are substantially similar to suspension assembly 50 described with respect to FIGS. 7 and 7A; however, instead of first and second magnets providing the shock absorbing or repelling force, a rubber or elastomer material 1558 is provided between force receiving member 64 and support member 66 in suspension assembly 1550 and a coil spring 1658 is provided between force receiving member 64 and support member 66 in suspension assembly 1650. Elastomer material 1558 may be integrally formed with shaft 52 or may be hollow and shaft 52 may extend there through. The spring rate of elastomer material 1558 and/or spring 1658 may be varied based on the application and/or may vary within an application. For example, the spring rate of elastomer material 1558 and/or spring 1658 may be higher if suspension assemblies 1550, 1650 are used to support a heavy appliance, such as a clothes dryer (see FIG. 12), as compared to supporting a lighter appliance, such as a computer (see FIG. 12). Additionally, for example, if suspension assemblies 1550, 1650 are used in a chair, the spring rate of elastomer material 1558 and/or spring 1658 may be higher in the seat bottom portion than the seat back portion of the chair.

Figure 17:
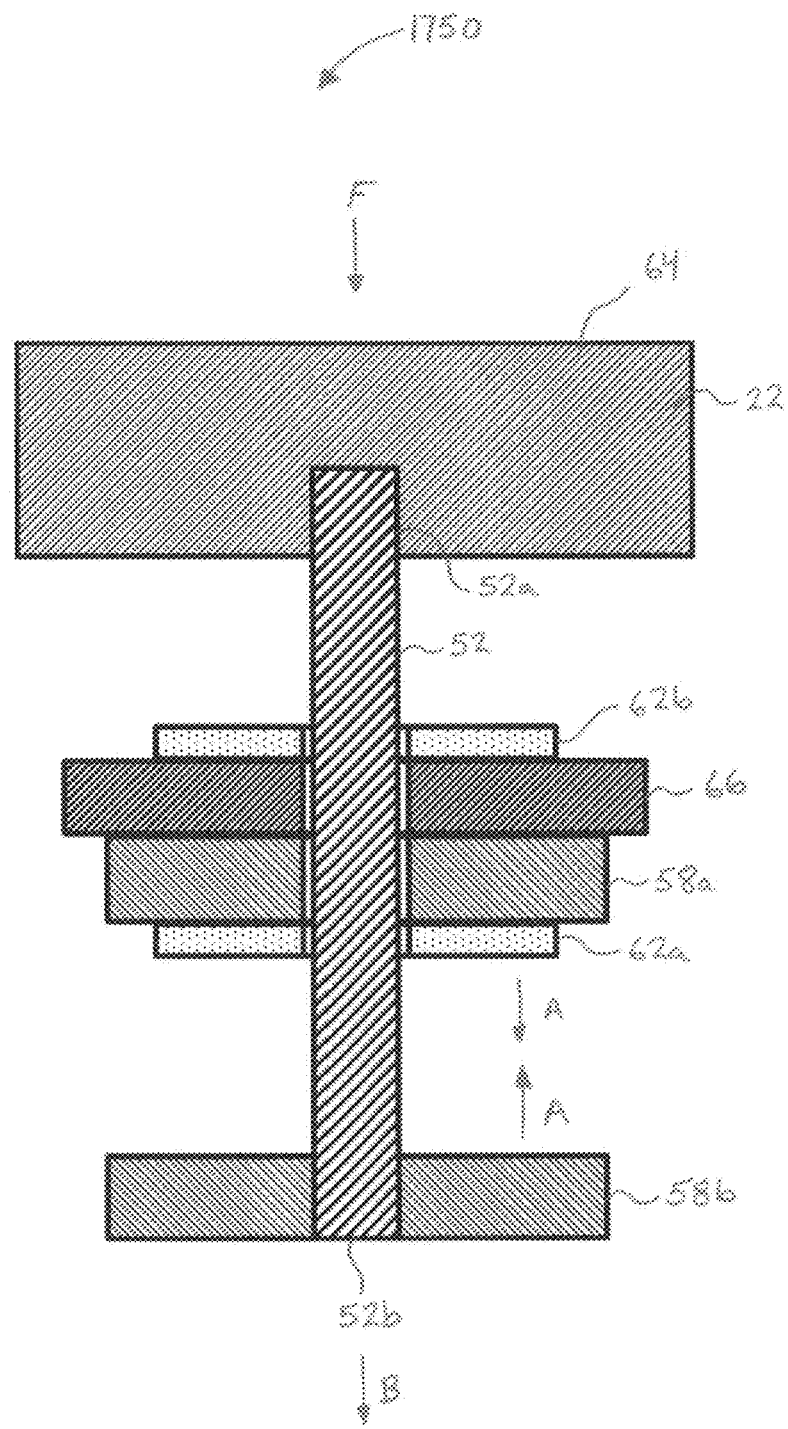
FIG. 17 is a section view of a suspension assembly according to another embodiment of the disclosure.

With reference now to FIG. 17, an alternative embodiment of suspension assembly 1750 is described in detail. Suspension assembly 1750 is similar to suspension assembly 50; however, instead of providing support by a repulsive magnetic force, support is provided by an attractive magnetic force. Suspension assembly 1750 includes shaft 52, with a first end 52*a* thereof being mounted to a force receiving member 64. Force receiving member 64 receives a force which acts on suspension assembly 50 causing shaft 52 to translate with respect to support member 66. In various embodiments, seating surface cross member 22 may be the force receiving member 64 and main frame member 18 may be the support member 66.

Suspension assembly 1750 further includes a first magnet 58*a* and a second magnet 58*b*. First magnet 58*a* is mounted to, on or in the underside of support member 66 and second magnet 58*b* is mounted to the second end 52*b* of shaft 52. First and second magnets 58*a*, 58*b* are preferably neodymium ring magnets. First and second magnets 58*a*, 58*b* are oriented in suspension assembly 50 to be attracted to one another as shown by arrows A. When a force (F) is acted on the top side of force receiving member 64, the exerted force (F) acts against the magnetic attractive force between first and second magnets 58*a*, 58*b*. The exerted force (F) may be great enough to cause translation of shaft 52 with respect to main support member 18 and linear bearing 54 in the direction of arrow B. If used in a chair, such as in chair 10 described above, the magnetic attractive force between first and second magnets 58*a*, 58*b* provides a spring-like cushion for the person sitting in chair 10 and/or the weight placed in chair 10.

Although neodymium ring magnets are preferred, in other embodiments, other magnet types may be used for first and second magnets 58*a*, 58*b* including, but not limited to, other rare-earth magnets (e.g., samarium-cobalt), permanent magnets made of other materials (e.g., ceramic, ferrite, alnico, etc.), electromagnets, etc. without departing from the scope of the disclosure. Additionally, in other embodiments, first and second magnets 58*a*, 58*b* may be in a shape other than a ring; for example, first and second magnets 58*a*, 58*b* may be square, rectangular, cylindrical, spherical or bar in shape without departing from the scope of the disclosure. That is, instead of two ring magnets, a plurality of opposed square, rectangular, cylindrical, spherical or bar-shaped magnets may be placed on force receiving member 64 and support member 66 to provide the magnetic attractive force.

As shown in FIG. 17, a first rubber bushing or washer 62*a* may be placed between first and second magnet 58*a*, 58*b*. First rubber bushing 62*a* prevents first and second magnets 58*a*, 58*b* from hitting each other when a force (F) is removed from force receiving member 64. This reduces or eliminates any undesirable sound that would otherwise occur from first and magnets 58*a*, 58*b* hitting each other. Additionally, first rubber bushing 62*a* also reduces or eliminates any damage to first and second magnets 58*a*, 58*b* when a force (F) is removed from force receiving member 64. This is particularly important because neodymium magnets are brittle and can easily chip or shatter when hit. A second rubber bushing or washer 62*b* may be placed between force receiving member 64 and support member 66 to prevent force receiving member 64 and support member 66 from hitting each other when a force is exerted on force receiving member 64. This reduces or eliminates any undesirable sound that would otherwise occur from force receiving member 64 and support member 66 hitting each other. In various embodiments, for example, the first and/or second magnets 58*a*, 58*b* of suspension assembly 1750 may be coated with a rubber or elastomeric material which provides impact protection. Therefore first rubber bushing 62*a* may not be required.

With reference now to FIGS. 18A-18D, an alternative embodiment of suspension assembly 1850 is described in detail with respect to an article of furniture 1800, shown as an ottoman. Article of furniture 1800 includes frame 1812 having left and right side frame members 1814*a*, 1814*b* connected by a plurality of main frame members 1818. Main frame members 1818 serve as support members 1866 of suspension assembly 1850.

Article of furniture 1800 further includes a plurality of suspension assemblies 1850 attached to or integrally formed with frame 1812. A plurality of seating surface cross members 1822 are translatably mounted to the frame 1812 by the plurality of suspension assemblies 1850. Seating surface cross members 1822 serve as force receiving members 64 of suspension assembly 1850. Preferably, the number of seating surface cross members 1822 is equal to the number of main frame members 1818. That is, for each main frame member 1818 there is a corresponding seating surface cross member 1822. However, it will be understood that in other embodiments, the number of seating surface cross members 1822 may be less than or greater than the number of main frame members 1818.

Figure 18A:
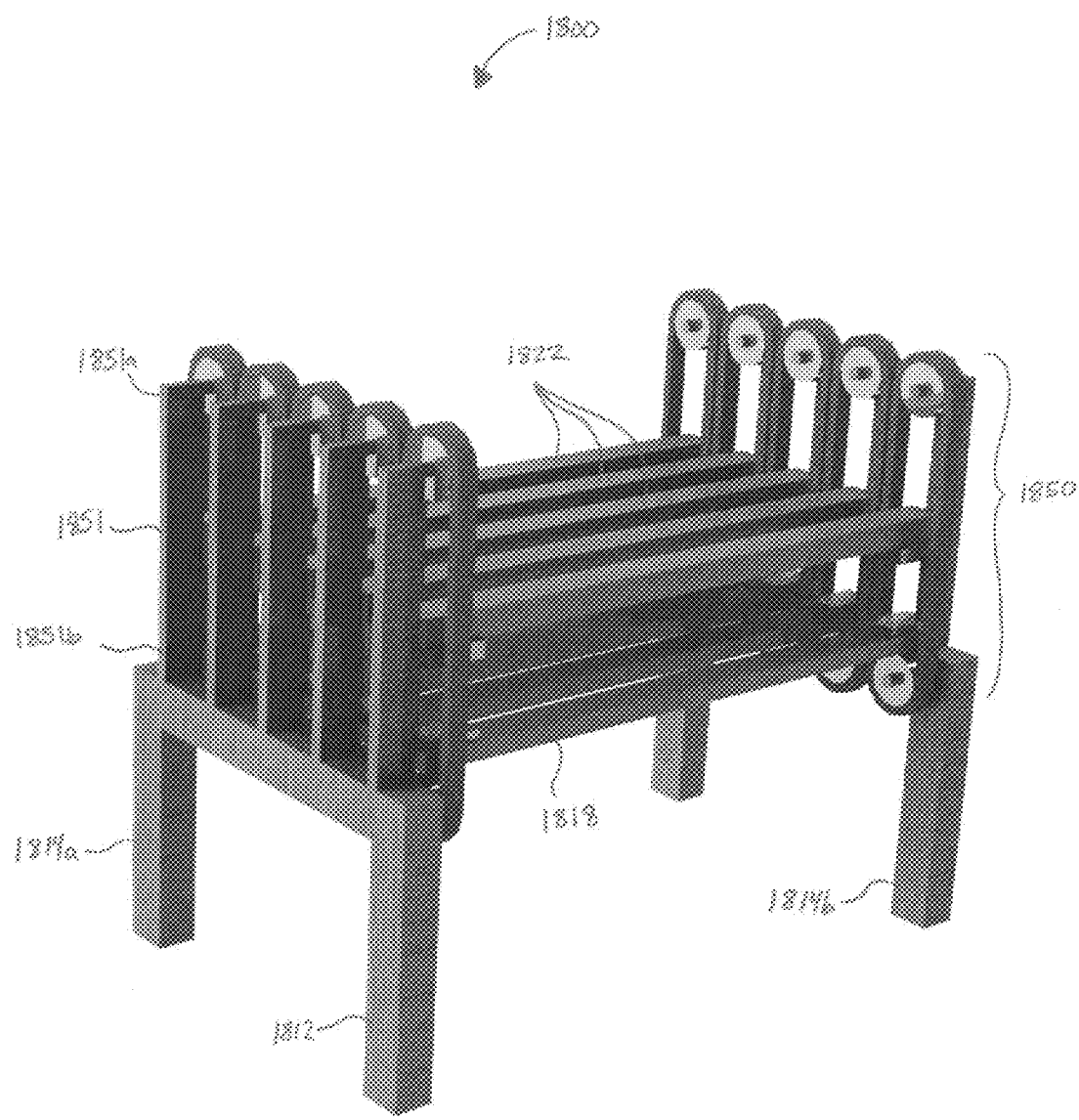
FIG. 18A is a left perspective view of an article of furniture incorporating a plurality of suspension assemblies according to another embodiment of the disclosure.
Figure 18B:
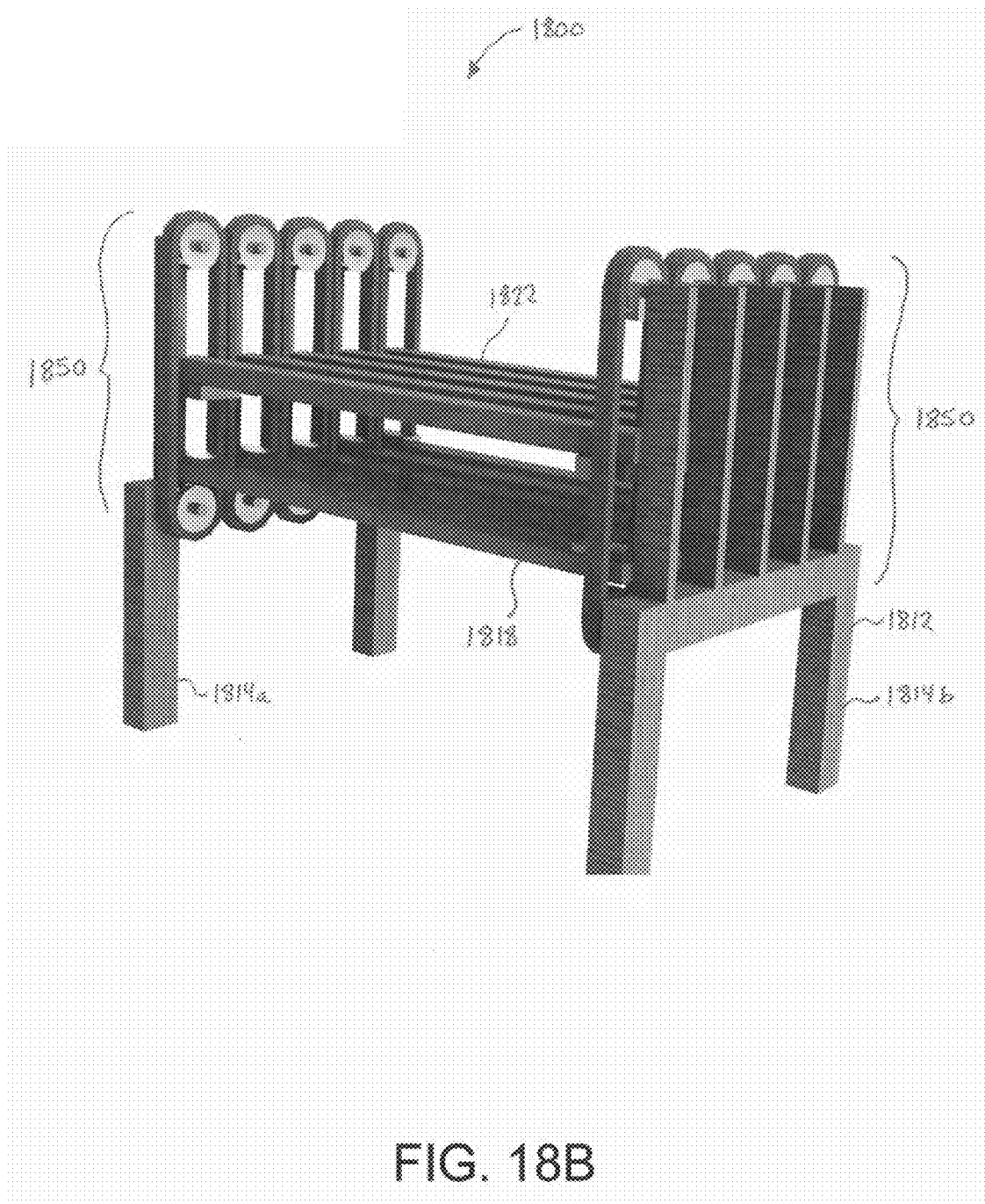
FIG. 18B is a right perspective view of the article of furniture incorporating a plurality of suspension assemblies according to the embodiment of the disclosure shown in FIG. 18A.
Figure 18C:
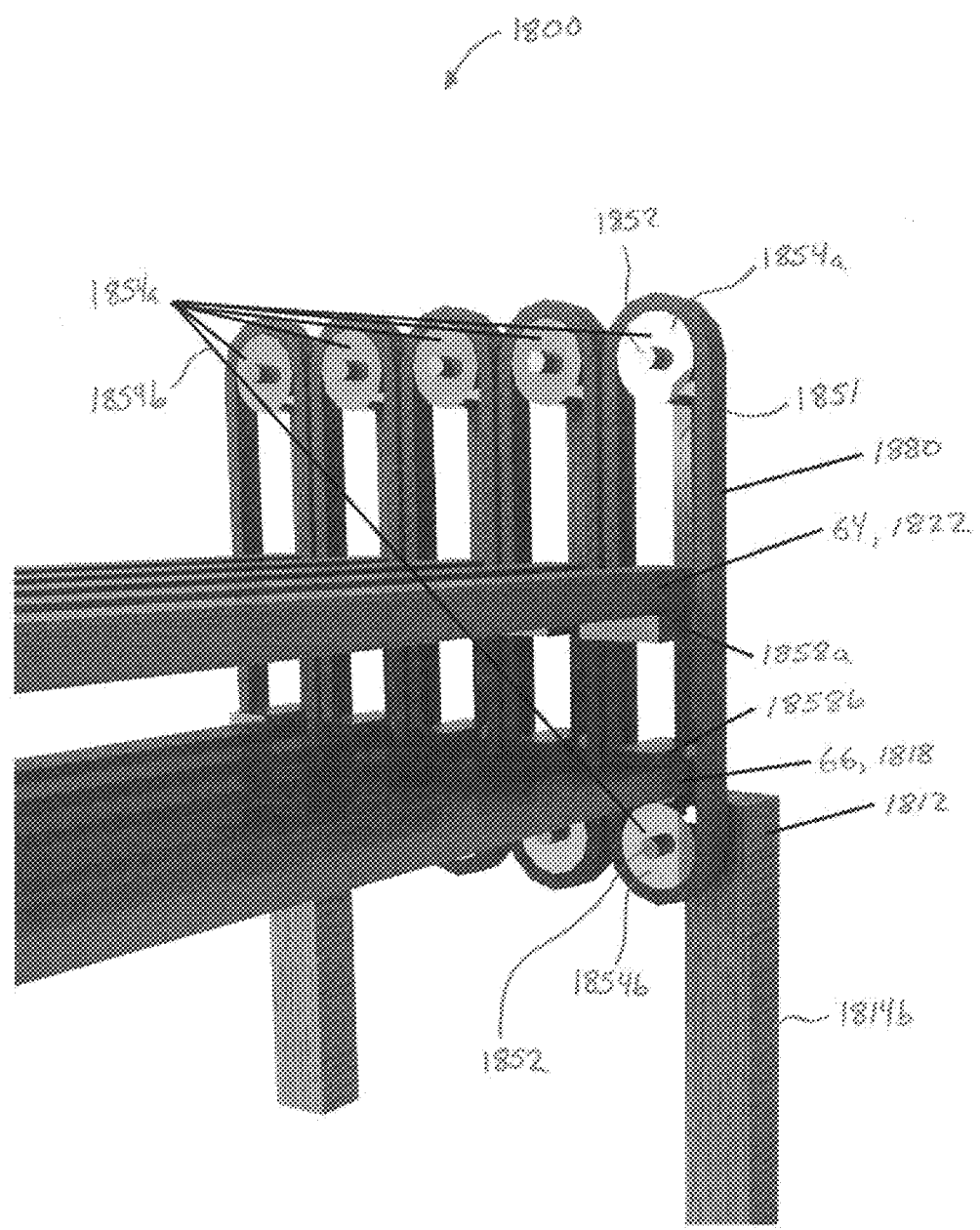
FIG. 18C is a detail left perspective view of the article of furniture incorporating a plurality of suspension assemblies according to the embodiment of the disclosure shown in FIG. 18A.
Figure 18D:
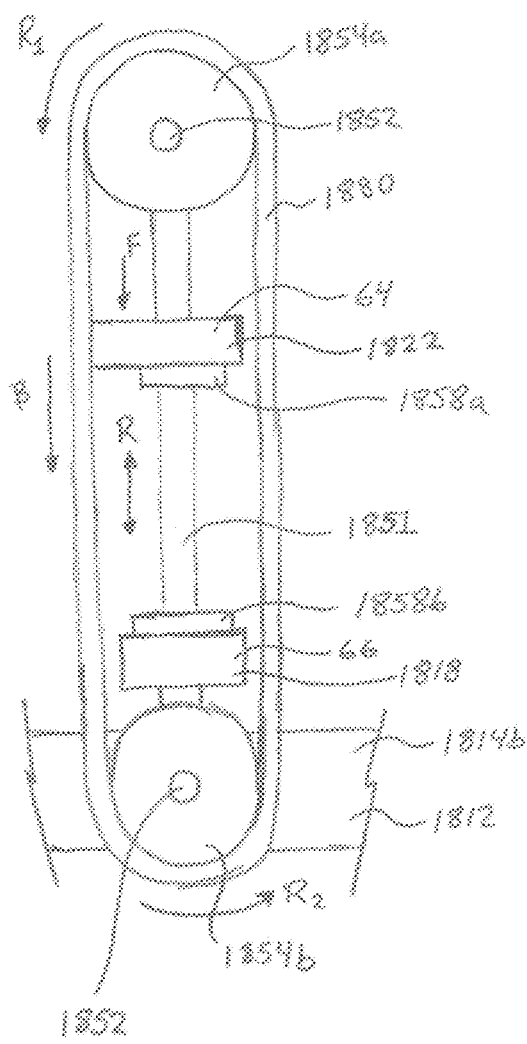
FIG. 18D is a partial section view of the article of furniture incorporating a plurality of suspension assemblies according to the embodiment of the disclosure shown in FIG. 18A.

As shown in FIGS. 18A, 18C and 18D, suspension assembly 1850 includes a substantially vertical support member 1851 having first end 1851a and second end 1851b. Second end 1851b of substantially vertical support member 1851 is mounted to or integrally formed with frame 1812. Suspension assembly 1850 further includes first pulley 1854a rotatably mounted to first end 1851a of substantially vertical support member 1851 by first shaft 1852a and second pulley 1854b rotatably mounted to frame 1812 proximate second end 1851b of substantially vertical support member 1851 by second shaft 1852a. Roller bearings (not shown) may be provided at the interface between first pulley 1854a and first shaft 1852a and second pulley 1854b and second shaft 1852b to aid in rotation of first and second pulleys 1854a, 1854b on first and second shafts 1852a, 1852b, respectively. A belt 1880 is installed on first and second pulleys 1854a, 1854b and transfers rotation from first pulley 1854a to second pulley 1854b. That is, a rotation of first pulley 1854a causes a translational movement of belt 1880 which results in a coextensive and coincident rotation of second pulley 1854b.

Suspension assembly 1850 further includes a force receiving member 64, shown as seating surface cross member 1822, and a support member 66, shown as main frame member 1818. Force receiving member 64 is mounted to belt 1880. Force receiving member 64 receives a force causing force receiving member 64 to translate with respect to support member 66.

Suspension assembly 1850 further includes a first magnet 1858a and a second magnet 1858b. First magnet 1858a is mounted to, on or in the underside of force receiving member 64 and second magnet 1858b is mounted to, on or in the top side of support member 66. First and second magnets 1858a, 1858b are preferably neodymium magnets. First and second magnets 1858a, 1858b are oriented in suspension assembly 1850 to be repelled from one another as shown by arrows R. When a force (F) is acted on the top side of force receiving member 64, the exerted force (F) acts against the magnetic repulsive force between first and second magnets 1858a, 1858b. The exerted force (F) may be great enough to cause translation of force receiving member 64 with respect to support member 66 and substantially vertical support member 1851 in the direction of arrow B. Because force receiving member 64 is mounted to belt 1880, the translation of force receiving member 64 causes a rotation of first and second pulleys 1854a, 1854b, in the direction of arrows $R_1$ and $R_2$, respectively. Thus, as compared to suspension assembly 50 (see FIGS. 7 and 7A) which utilizes a linear bearing for supporting and guiding the translation of force receiving member 64, suspension assembly 1850 utilizes roller bearings, first and second pulleys 1854a, 1854b, and belt 1880 to support and guide the translation of force receiving member 64. The magnetic repulsive force between first and second magnets 1858a, 1858b provides a spring-like cushion for a person sitting or resting on and/or a weight placed on article of furniture 1800.

Although neodymium magnets are preferred, in other embodiments, other magnet types may be used for first and second magnets 1858a, 1858b including, but not limited to, other rare-earth magnets (e.g., samarium-cobalt), permanent magnets made of other materials (e.g., ceramic, ferrite, alnico, etc.), electromagnets, etc. without departing from the scope of the disclosure.

In various embodiments, first and second pulleys 1854a, 1854b may include teeth and/or grooves which cooperate with teeth and/or grooves in belt 1880 which may reduce and/or prevent slippage of belt 1880 on first and/or second pulleys 1854a, 1854b. In yet other embodiments, first and second toothed gears may be used instead of first and second pulleys 1854a, 1854b and a chain may be used instead of belt 1880.

Thus, there has been shown and described novel apparatuses of a suspension assembly. It will be apparent, however, to those familiar in the art, that many changes, variations, modifications, and other uses and applications for the subject devices and methods are possible. All such changes, variations, modifications, and other uses and applications that do not depart from the spirit and scope of the invention are deemed to be covered by the invention which is limited only by the claims which follow.

What is claimed is:

1. A suspension assembly mounted to a support member for resisting a force applied to a force receiving member comprising:
   a shaft having a first end and a second end, the first end mounted to the force receiving member;
   a linear bearing within which the shaft is translatably received, the linear bearing mounted to the support member and protruding longitudinally on a side of the support member opposite the force receiving member;
   a first magnet positioned immediately adjacent the force receiving member; and
   a second magnet positioned immediately adjacent the support member,
   wherein the first and second magnets are oriented to repel one another to provide a magnetic force to resist the force applied to the force receiving member; and
   a shaft collar mounted to the second end of the shaft and disposed on a side of the support member opposite the first and second magnets.

2. The suspension assembly of claim 1, wherein one of the magnets is a ring magnet.

3. The suspension assembly of claim 1, wherein one of the magnets is a neodymium magnet.

4. The suspension assembly of claim 1, wherein the magnets are comprised of materials selected from the group consisting of rare-earth materials, samarium-cobalt, ceramic materials, ferrite materials, and alnico materials.

5. The suspension assembly of claim 1, wherein one of the magnets is an electromagnet.

6. The suspension assembly of claim 1 further comprising a bushing placed between first and second magnets.

7. The suspension assembly of claim 1 further comprising a bushing placed between the force receiving member and the support member.

8. The suspension assembly of claim 1 wherein the shaft is a first shaft and the linear bearing comprises a second tubular shaft mounted to the support member, wherein the first shaft translates within the second tubular shaft.

9. The suspension assembly of claim 1, wherein the linear bearing is a linear recirculating ball bearing.

10. The suspension assembly of claim 1, wherein the linear bearing is a bushing comprised of materials selected from the group consisting of graphite infused-brass, plastic, nylon and Teflon® polytetrafluoroethylene (PTFE).

11. An item of furniture comprising:

a frame; and a plurality of cross members each translatably mounted to the frame by a suspension assembly, the suspension assembly comprising:

- a shaft having a first end and a second end, the first end mounted to one of the cross members;
- a linear bearing within which the shaft is translatably received, the linear bearing mounted to the frame and protruding longitudinally on a side of the frame opposite the cross members;
- a first magnet positioned immediately adjacent one of the cross members;
- a second magnet positioned immediately adjacent the frame; and
- a shaft collar mounted to the second end of the shaft and disposed on a side of the frame opposite to the first and second magnets, wherein the first and second magnets are oriented to repel one another to provide a magnetic force to resist a force applied to the cross member.

12. The item of furniture of claim 11 wherein the shaft is a first shaft and the linear bearing comprises a second tubular shaft mounted to the frame, wherein the first shaft translates within the second tubular shaft.

13. The item of furniture of claim 11, wherein one of the magnets is a ring magnet.

14. The item of furniture of claim 11, wherein one of the magnets is a neodymium magnet.

15. The item of furniture of claim 11, wherein the magnets are comprised of materials selected from the group consisting of rare-earth materials, samarium-cobalt, ceramic materials, ferrite materials, and alnico materials.

16. The item of furniture of claim 11, wherein one of the magnets is an electromagnet.

17. The item of furniture of claim 11 further comprising a bushing placed between first and second magnets.

* * * * *